(12) United States Patent
London (10) Patent No.: US 7,583,159 B2
(45) Date of Patent: Sep. 1, 2009

(54) HIGH POWER BIPOLAR PULSE GENERATORS WITH IMPEDANCE TRANSFORMATION

(75) Inventor: Simon Y. London, Rockville, MD (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 51 days.

(21) Appl. No.: 11/716,582

(22) Filed: Mar. 12, 2007

(65) Prior Publication Data

US 2008/0224794 A1 Sep. 18, 2008

(51) Int. Cl.
*H04B 3/04* (2006.01)
(52) U.S. Cl. .............................. 333/20; 333/33; 307/106
(58) Field of Classification Search ................... 333/20, 333/33; 307/106
See application file for complete search history.

(56) References Cited

U.S. PATENT DOCUMENTS

| 4,536,723 A | | 8/1985 | Lang et al. |
| 4,614,878 A | * | 9/1986 | Lauchner et al. ............ 307/106 |
| 2003/0151465 A1 | * | 8/2003 | Wood ................... 331/107 SL |
| 2007/0013315 A1 | * | 1/2007 | Rhodes ........................ 315/39 |
| 2007/0237208 A1 | * | 10/2007 | Maxwell et al. ............. 375/130 |

FOREIGN PATENT DOCUMENTS

RU 1 098 502 9/1996
RU 2 128 877 4/1999

OTHER PUBLICATIONS

Andreev, Y, et al., "High-Power Ultrawideband Electromagnetic Radiation Generator," IEEE, vol. 7803, pp. 730-735; 1997.
Koshelev, V., et al., High-Power Ultrawideband Electromagnetic Pulse Radiation, SPIE, vol. 3158, pp. 209-219, 1997.
Ohmura, J., et al., "Bidirectional Pulse Generator System for Linear Induction Accelerator", 12th International Conference on High Power Particle Beams, pp. 277-280, 1998.
International Search Report dated Aug. 21, 2008.

* cited by examiner

*Primary Examiner*—James Cho
(74) *Attorney, Agent, or Firm*—Bingham McCutchen LLP; Robert C. Bertin (57) ABSTRACT

A bipolar pulse generator circuit generates bipolar pulses and provides an impedance transformation. The circuit is amenable for implementation in a variety of configurations depending on the size and pulse width requirements for the design. It also maximizes energy transfer and may be implemented in a straight forward, easy manner.

The generator may be implemented with one or two switches in a three, five or more transmission line implementation and may include inductive stub, which is inherent element of transmission line transformers. The generator may also be implemented in a multi-layer folded configuration, with or without the addition of a ground potential conductor. The generator may also be implemented in stacked or/and balanced configurations.

27 Claims, 9 Drawing Sheets

HIGH POWER BIPOLAR PULSE GENERATORS WITH IMPEDANCE TRANSFORMATION

FIELD OF THE INVENTION

The present invention relates generally to bipolar pulse generators, particularly to the high power bipolar pulse generators that provide impedance transformation.

BACKGROUND OF THE INVENTION

Modern trends in High Power Microwave (HPM) sources for a variety of applications are directed towards increasing radiated power and efficiency in order to increase energy density (energy per volume). Transmission line type pulse generators with photoconductive switches can achieve some of the best results. In particular, they are compact and provide fast pulse rise time, high power, and are suitable for generating short pulses (nanoseconds range) with perfect shape.

For a given charging voltage for transmission lines, limited by electric field in photoconductive switches, high powered and high energy density transmission lines imply low characteristic impedances. For bipolar pulse generators having transmission lines with low characteristic impedances (in the mOhm range), a problem occurs when the generators are used to drive typical load impedances, such as 50 Ohm or higher. This problem is generally addressed using impedance transformers to transform impedance from a low value in the bipolar pulse generator to a higher value presented by the load. It is reasonable to define the required impedance transformation as a ratio of specified load impedance and the lowest characteristic impedance of transmission line in pulse generator.

There are known efficient transmission line bipolar pulse generators, which provide high energy pulses without or with very limited impedance transformations. In addition, there are known impedance transformers of two categories suitable for transformation of short pulses:

Stepped (multi-sectional) and non-uniform transmission-line transformers (Tchebyscheff, exponential and others types)

Transmission-line transformers with series-parallel interconnected lines. In general, transformers of first category when used to transform from mOhm impedances to, for example 50 Ohms, generally have low efficiency, large size and are also difficult to fabricate. Therefore, these transformers themselves can defeat some of the advantages of having high efficiency, high powered and high energy density transmission line bipolar pulse generators.

Transformers of the second category are more efficient, but have, in principle, shunt inductance(s) or short-circuited (on a far end) transmission line(s), i.e. inductive stub(s) that deteriorate the pulse shape.

The final result is that known lower energy bipolar pulse generators with efficient impedance transformation, are more compact and provide about the same energy as higher energy bipolar pulse generators with moderate impedance transformation. See, for example, the co-pending patent application by Simon London, entitled BiPolar Pulse Generator With Voltage Multiplication," filed on Nov. 9, 2005 and assigned application Ser. No. 11/269,847.

In a wide class of transmission line bipolar pulse generators, all transmission lines are of equal electrical length and are charged with equal voltage. This voltage is limited by fast rise time photoconductive switches and, consequently, by an optimally chosen transmission line with lowest characteristic impedance.

Each transmission line stores energy that is proportional to the inverse of the line's characteristic impedance. To compare different generator's circuits, the total energy stored in all transmission lines can be determined in relation to the energy stored in the transmission line with lowest characteristic impedance. Lower characteristic impedance implies less dielectric thickness between the line's conductors and, therefore, a higher electric field, which is a limitation for selected charging voltage defined by the chosen switch.

Other aspects of structure selection of pulse generators are: suitable switch positions and the potential existence of shunt inductive stub for efficient usage of transmission line transformers.

Still another aspect of structure selection of a pulse generator is the position of an inductive stub, which can be incorporated with a transformer having an optimum ratio of load impedance and impedance of a shunt inductive stub. Some physical structures of bipolar pulse generators need a short-circuited stub, for example, as a resonant cavity.

No known bipolar pulse generators, however, have all desirable factors: 1—Maximum stored (transferred to the load as a pulse) energy; 2—Efficient impedance transformation; and 3—Inductive stub incorporable with a transformer; and 4—Simplicity of design and compactness.

Accordingly, there remains a need for a bipolar pulse generator solution based on voltage charged transmission lines, which is capable of implementing high energy/power and required impedance transformation ratios. There remains a further need for a bipolar pulse generator that combines three properties: maximizes stored energy transferred to the load as a pulse, easy to implement and that is able to efficiently transform the load impedance of the generator to a higher level of impedance compared to the lowest characteristic impedance of generator's transmission line. There is a further need for a bipolar pulse generator which is capable of being implemented in a compact structure. There is a future need for a bipolar pulse generator in which inductive stub of transformer is a circuit element of a generator with high energy/power, and which does not deteriorate generating pulse shape. There is still a further need for a bipolar pulse generator in which impedance of an inductive stub shunting the resistive load impedance may be selected for an optimum value.

SUMMARY OF THE INVENTION

According to the present invention, bipolar pulse generators provide bipolar pulses and efficient impedance transformation. The circuits are amenable for implementation in a variety of configurations depending on the pulse power, preferable size and required pulse width. They also maximize energy transfer and may be implemented in a straightforward, easy manner.

According to one embodiment of the present invention, the simplest bipolar pulse generator provides very close to the maximum energy on the load and is suitable for efficient impedance transformation in compact design. This generators with inductive stub may be implemented with one or two switches and in folded or unfolded configurations, as well as in balanced and/or in stacked configurations. According to this embodiment of the invention, the bipolar pulse generator includes two equally charged two-conductor transmission lines, having respective characteristic impedances of Z1 and Z2, and a third transmission line with characteristic impedance Zs1, which is short-circuited on the far end. There is specific relation between values of characteristic impedances of these three equal length transmission lines and resistive load impedance for optimum solution in energy on the load, impedance transformation and non-deteriorated pulse shape.

According to another embodiment of the present invention, the bipolar pulse generator provides close to 1:4 impedance transformations, near the maximum energy on the load, and is suitable for a further efficient impedance transformation. It includes the inductive stub, which does not deteriorate the pulse shape.

According to this embodiment of the present invention the bipolar pulse generator includes five transmission lines with equal electrical length and a load with some impedance. Four transmission lines are charged by equal voltage and the fifth line is short-circuited at far (inductive stub) and connected to the load. This inductive stub may "represent" inductive stub in the real transformer and may be selected in a proper value. All five values of line's characteristic impedances and load impedance are correlated to keep non-distorted bipolar pulse. The generator may be implemented with one or with two switches. The generator may also be implemented in folded or unfolded configurations and with or without the additional ground potential connection. The generator may also be implemented in balanced and/or in stacked configurations for increased energy/power and transformation ratio. In another embodiment of a folded configuration each charged transmission line comprises one or more transmission line segments.

According to still another embodiment of the present invention, a bipolar pulse generator may be implemented that comprises four charged two-conductor transmission lines, having respective impedances of Z1, Z2, Z3, Z4, a common length and a common conductor, two switches and a load impedance, which is shunted by additional two-conductor transmission line with characteristic impedance Zs1 and short-circuited at far end. The near end of the Z1 transmission line and the far end of the Z2 transmission line are coupled to the common conductor through respective switches, the far end of the Z1 transmission line and the near end of the Z4 transmission line are coupled together through the load impedance, the far end of the Z4 transmission line is coupled to the near end of the Z3 transmission line and the far end of the Z3 transmission line is coupled to the near end of Z2 transmission line. The non-charged fifth transmission line is connected to the load and short-circuited at the far end.

According to still another embodiment of the present invention, a bipolar pulse generator is matched with transmission line transformer in a way that inductive stub of the transformer does not deteriorate pulse shape.

According to still another embodiment of the present invention, a bipolar pulse generator consists of stacked configuration of identical groups of four charged transmission lines and an inductive stub connected in parallel to the load. According to still another embodiment of the present invention, bipolar pulse generators may be implemented with lumped elements when each group of lumped elements is lumped equivalent of corresponding transmission line.

BRIEF DESCRIPTION OF THE DRAWINGS

The features and advantages described above of the present invention will be more fully appreciated with reference to the detailed description and figures, in which:

FIG. 1b illustrates the ideal bipolar pulse shape assuming that transmission lines are lossless and an ideal switch in the generator according to FIG. 1a.

FIGS. 12 (a, b) depicts another schematics of three- and five-line bipolar pulse generators according to an embodiment of the present invention that incorporated two switches.

FIGS. 13 (a, b) depicts another schematic of three-and five-line bipolar pulse generators according to an embodiment of the present invention, that have symmetrical configuration with respect to a floating (physically not existing) "ground" plane.

DETAILED DESCRIPTION

Figure 1A:
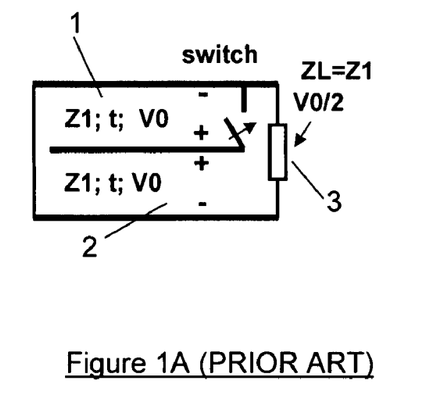
FIG. 1a depicts a schematic of the simplest transmission line bipolar pulse generator according to prior art.

FIG. 1(a) illustrates a schematic of a well-known bipolar pulse generator (A. I Pavlovskii et al in Soviet Phys. Dokl. V.20, 1975). A modification of this generator was presented in U.S. Pat. No. 4,536,723. In this generator, with a closing switch, the impedance ZL of matched load 3 is equal to the characteristic impedance Z1 of the two equally charged transmission lines 1 and 2, and voltage on the load is equal to ½ of the charged voltage of the transmission lines.

Figure 1B:
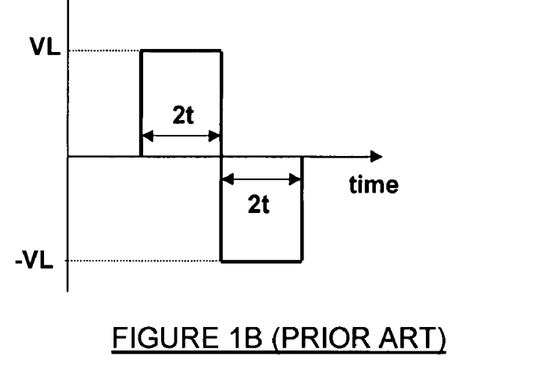

This is the best case with respect to two factors, energy and efficiency. However, this generator provides no impedance transformation to a load 3, having the same impedance Z1. The total stored energy in the generator is twice the energy stored in each transmission line, and all the stored energy is transferred to the bipolar pulse illustrated on FIG. 1(b) for the ideal case when both transmission lines are lossless and the switch is ideal.

Modern, fast rise time, photo-conductive switches (operating in the picoseconds range) operate at voltages up to several kV, and may be implemented in generators. A preferable structure for each transmission line in the generator is, in most cases, a parallel plate configuration. However, all transmission lines may be implemented with different configurations of the transmission line's conductors, including a coaxial conductor configuration, or any other convenient implementation.

In all figures we will assume a practical case when the thickness of a transmission line's strip conductors is much more than the depth of penetration of the signals. That means both sides of each physical strip conductor operate as two conductors of different (adjacent) transmission lines. This simplifies a discussion of the figures and transmission line operation.

Figure 2:
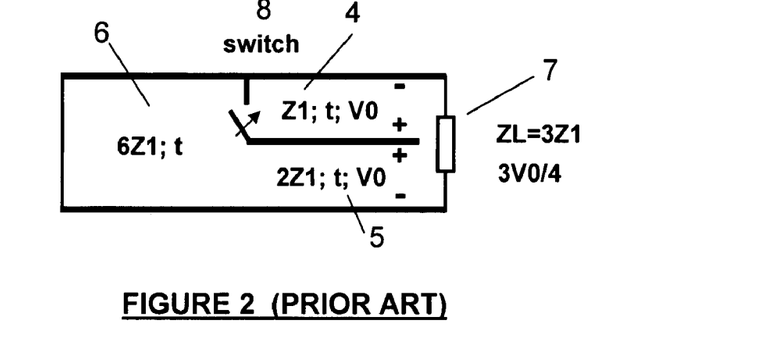
FIG. 2 depicts a schematic of a three transmission line bipolar pulse generator according to the prior art.

FIG. 2 illustrates another bipolar pulse generator found in the prior art, (I. Smith "Linear Induction Accelerators made from Pulse-line Cavities with External Pulse Injections" Rev. Scientific Instruments, Vol. 50, p. 714; 1979). This generator includes three transmission lines 4-6 and provides some impedance transformation to the load 7, shown as ZL=3 Z1 relative to the lowest characteristic impedance of the charged transmission lines 4 and 5. However, stored energy in both charged transmission lines 4 and 5 equals 75% of the stored energy in generator on FIG. 1a, assuming the same Z1 with lowest characteristic impedance. Thus, bipolar pulse generator FIG. 3 does not maximize stored and transfer energy. The same 75% ratio holds for the power applied to the load in the circuit of FIG. 2 as compared to the power/energy applied to the load in the circuit of FIG. 1a.

Figure 3:
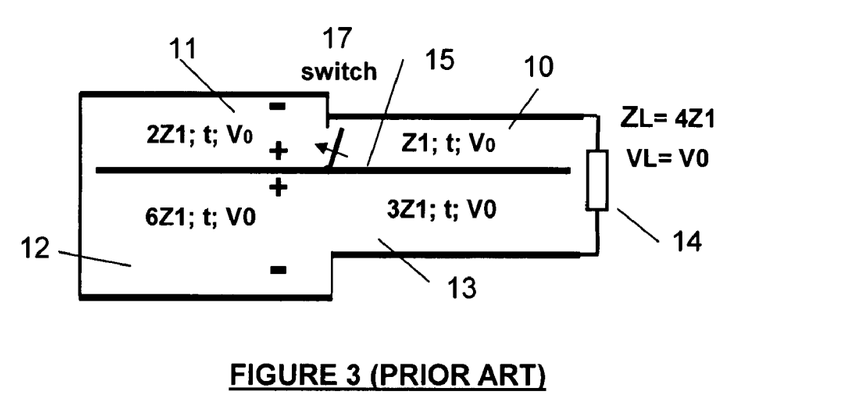
FIG. 3 depicts a schematic of a four-line bipolar pulse generator with 1:4 impedance transformation according to the prior art.

The bipolar pulse generator illustrated in FIG. 3 ("High-Voltage Pulse Generator", Patent, SU 1098502 C1.Int. Cl. H 03 K 3/53, 1996) is another generator according to the prior art. It includes four equally charged transmission lines 10-13 with common conductor 15 and provides 1:4 impedance transformation to the load 14. Stored energy in all four charged transmission lines is equal to the stored energy found in the generator of FIG. 1a, assuming the same charging voltage V0 and equal lowest characteristic impedances of transmission lines 1 and 10. Thus, this generator maximizes stored/transfer energy, because of ½+⅓+⅙=1. However, this generator as well as generators of FIGS. 1 and 2 are not suitable for further impedance transformation. In particular, they do not include an inductive stub of a real transmission line transformer.

Figure 4:
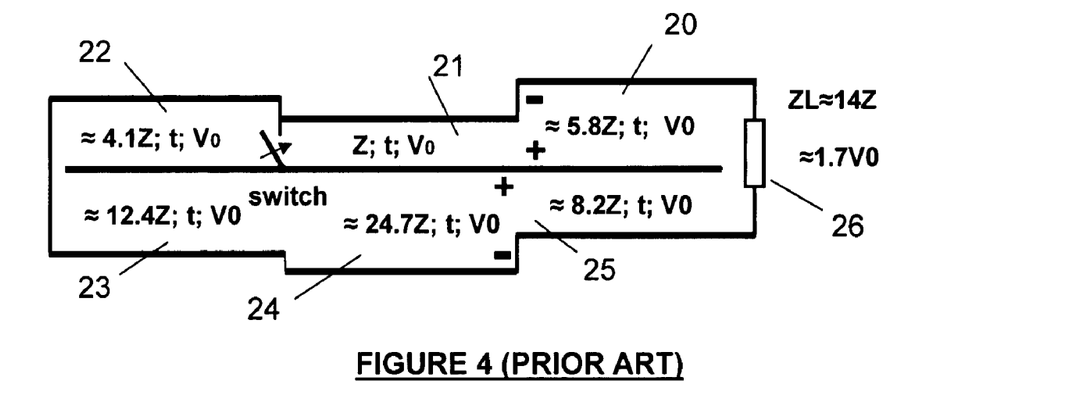
FIG. 4 depicts a schematic of a six-line bipolar pulse generator with further impedance transformation (1:14) according to the prior art.

The bipolar pulse generator illustrated in FIG. 4 ("High-Voltage Pulse Generator", Patent, RU 2 128 877 C1.Int. Cl. H 03 K 3/53, 1999) is another generator according to the prior art. It includes six equally charged transmission lines 20-25 and provides substantial impedance transformation (1:14) to the load 26. However, stored energy in all six charged transmission lines is equal to approximately 83% of the stored energy found in the generator of FIG. 1a or FIG. 3, assuming the same charging voltage V0 and equal corresponding lowest characteristic impedances of transmission lines 1, 10 and 21. Thus, this generator does not maximize stored/transfer energy. Also, the structure of the generator in FIG. 4 with high ratios of characteristic impedances (24.7 max) is difficult to realize with good agreement to the theoretical pulse shape.

Still another known bipolar pulse generator is illustrated in co-pending patent application by Simon London, entitled "BiPolar Pulse Generator With Voltage Multiplication," filed on Nov. 9, 2005 and assigned application Ser. No. 11/269, 847, and shown in FIG. 5 with five transmission lines 30-34. This generator provides higher impedance transformation to the load 35 compared to the circuit of FIG. 4 and has fixed characteristic impedance of inductive stub 34 connected in parallel to the load 35, which is suitable for further impedance transformation by the transmission line transformer. However, stored energy is equal to ⅔ of the energy stored in transmission lines of the generator illustrated on FIG. 1a or on FIG. 3, assuming equal characteristic impedances Z1 of transmission lines 1, 2, 10 and 30. Besides, inductive stub 34 has fixed value of characteristic impedance relative to load impedance 35.

Figure 6:
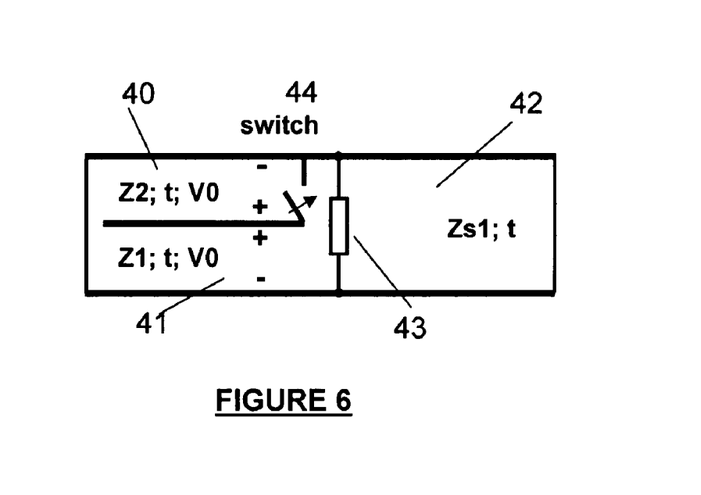
FIG. 6 depicts a schematic of the three-line bipolar pulse generator according to an embodiment of the present invention.
Figure 8:
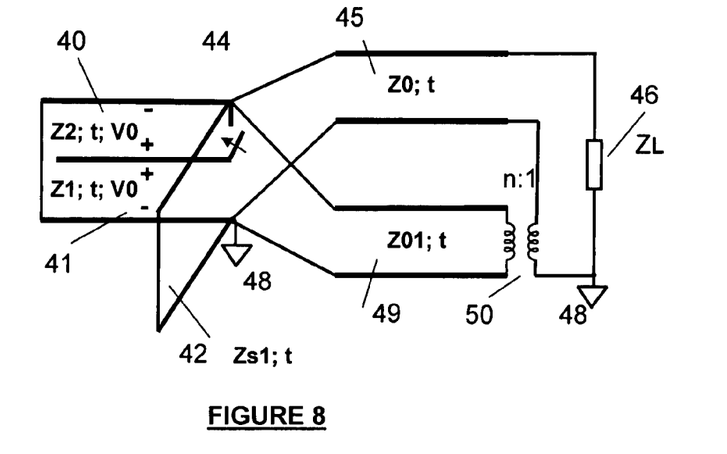
FIG. 8 depicts a schematic of equivalent transformation for incorporating 1:4 transmission line transformer and bipolar pulse generator according to the embodiment of the present invention.

According to an embodiment of the present invention, a bipolar pulse generator shown in FIG. 6 includes three transmission lines 40, 41, 42. It has a simple structure and inductive stub 42 in parallel to load 43. A full structure of a real design, for example, with a known additional 1:4 transmission line transformer the full structure is shown on FIG. 7. The transmission line impedance Z0 of transformer and transmission line impedance Zs of inductive stub 47 of transformer may be correlated to transmission line impedances Z1 and Z2 of pulse generator to provide non-distorted bipolar pulse shape on resistive load 46 with impedance ZL. For this reason the physically existing inductive stub with characteristic impedance Zs transformed to the output of pulse generator as illustrated on an equivalent circuit shown in FIG. 8. This circuit FIG. 8 may be considered as consisting in two parts:

A transformer without inductive stub, with transmission lines 45, 49 and ideal transformer 50, and therefore, a transformer, which does not deteriorate bipolar pulse shape, A pulse generator, which incorporates inductive stub 42 and generate non-distorted bipolar pulse.

Figure 7:
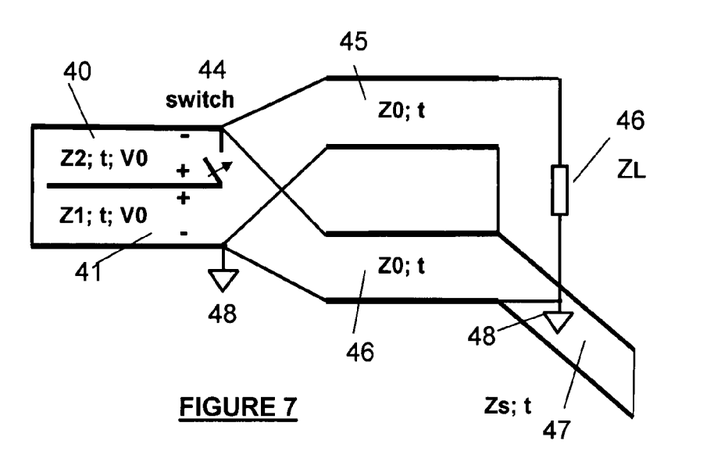
FIG. 7 depicts a schematic of combined circuit comprising of a three-line bipolar pulse generator and 1:4 impedance ratio transmission line transformer as an embodiment of the present invention.

Equations for equivalent circuits in FIGS. 7 and 8 that provide these properties are:

$$ZL = Z0 + Z0 \| Zs = Z0*(Z0+2Zs)/(Z0+Zs) \quad (1)$$

$$n = (1+Z0/Zs) \quad (2)$$

$$Z01 = Z0*n \quad (3)$$

$$Zin = Z0*(Zs+Z0)/(2Zs+Z0) \quad (4)$$

$$Z1 = Z0*(Zs+Z0)/2Zs \quad (5)$$

$$Z2 = Z1*(2Zs+Z0)/(2Zs-Z0); \ 2Zs \geq Z0 \quad (6)$$

$$W/W\,max=2Zs/(2Zs+Z0)(\text{energy Efficiency in FIG. }9B) \qquad (7)$$

Impedance Zin is resistive input impedance of transformer (resistive load of pulse generator) shunted by inductive stub 42 with impedance Zs1 and Z1||Zs1=Zin.

Figure 5:
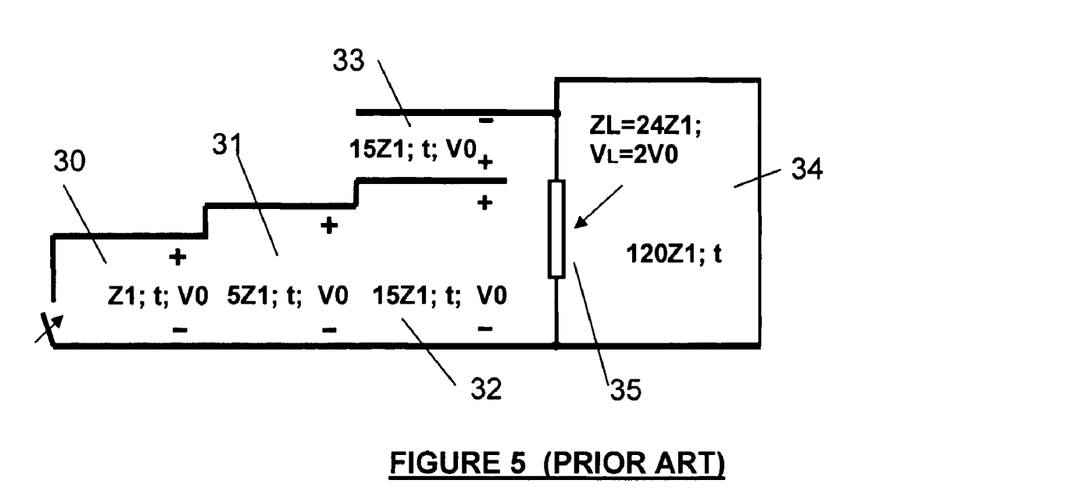
FIG. 5 depicts a schematic of a five-line bipolar pulse generator with further (1:24) impedance transformation according to the prior art.

In all practical cases with additional real transformer $1<k<\infty$, where k=2Zs/Z0. In case k=1, generator FIG. 6 is transformed to FIG. 5a in co-pending patent application by Simon London, entitled BiPolar Pulse Generator With Voltage Multiplication," filed on Nov. 9, 2005 and assigned Application No. 11/269,847, and in the case k=∞ generator FIG. 6 is transformed to FIG. 1a. As a result, generator FIG. 6 is a general case, which provides continuous transition between two prior known generators and two particular cases.

Figure 9A:
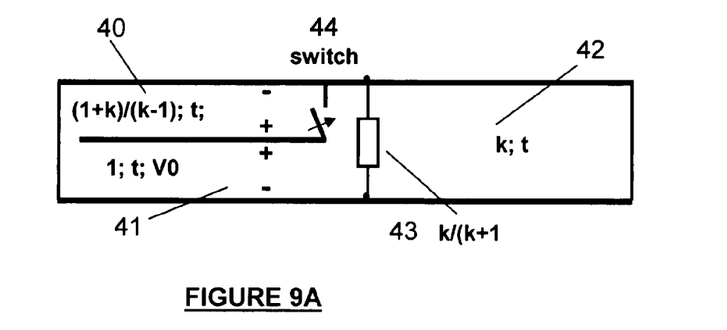
FIG. 9a depicts a schematic of bipolar pulse generator according to FIG. 6 with optimum values of impedances normalized to Z1=1.
Figure 9B:
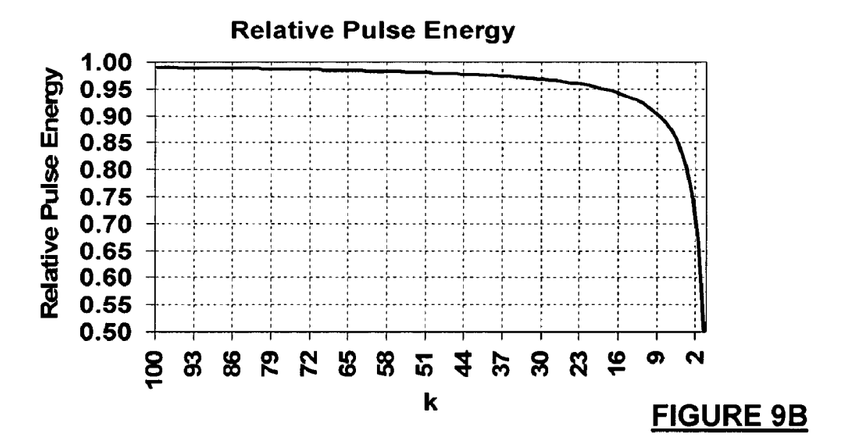
FIG. 9b depicts a graph that illustrates pulse energy of generator FIG. 6 relative to generator on FIG. 1a as a function of coefficient K.

Proposed bipolar pulse generator according to FIG. 6 with normalized (Z1=1) characteristic impedances of transmission lines 40, 41, 42 and load impedance 43 is shown on FIG. 9a.

FIG. 9b illustrates the ratio of pulse energy with inductive stub to maximum pulse energy produced by generators FIG. 1a or FIG. 3, assuming equal lowest characteristic impedances Z1.

Practically, the ratio k=2Zs/Z0 is at least 10 that means the decreasing pulse energy is less than 10% compared to maximum value when k=∞

In reality, different types of real 1: N transmission line transformers could be represented with enough accuracy as distortion-less 1: N1 transformer and inductive stub on its input. This stub will be referenced to inductive stub 42 in FIG. 9a Referring to FIG. 10, which illustrates schematic of another bipolar pulse generator, according to an embodiment of the present invention. This generator consists of four equally charged transmission lines 50-53, resistive load 54 with impedance ZL and inductive stub 55 with characteristic impedance Zs1. For specific ratios between characteristic impedances of transmission lines 50-53, having common conductor 56, load impedance ZL and stub's impedance Zs1, this generator provides (similar to FIG. 6) non-distorted bipolar pulse. Consequently, this bipolar pulse generator with inductive stub 55 having characteristic impedance Zs1 is suitable for further impedance transformation similar to FIG. 7 and FIG. 8. In all cases, i.e., independent on the relative impedance of inductive stub of transformer Zs, the ratio Z1/Z4=Z2/Z3=⅓. The ratio Z2/Z1=Z3/Z4 is dependent on the ratio Zs/ZL of transformer. Normalized to Z1=1 values of all impedances of pulse generator are shown on FIG. 11.

Figure 10:
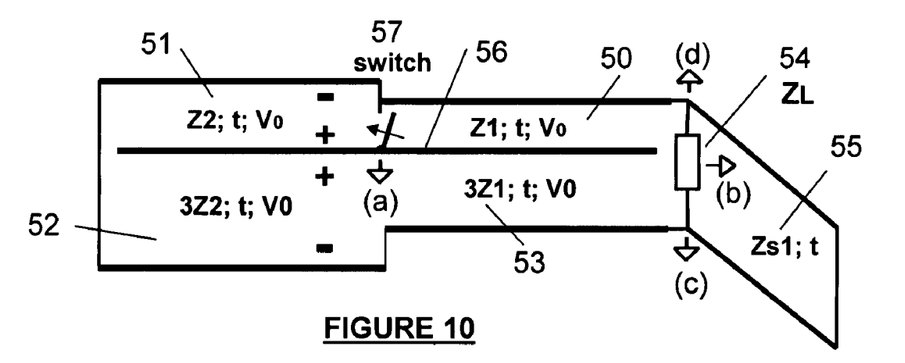
FIG. 10 depicts a schematic of five-line bipolar pulse generator with different positions of ground potential according to an embodiment of the present invention.
Figure 11:
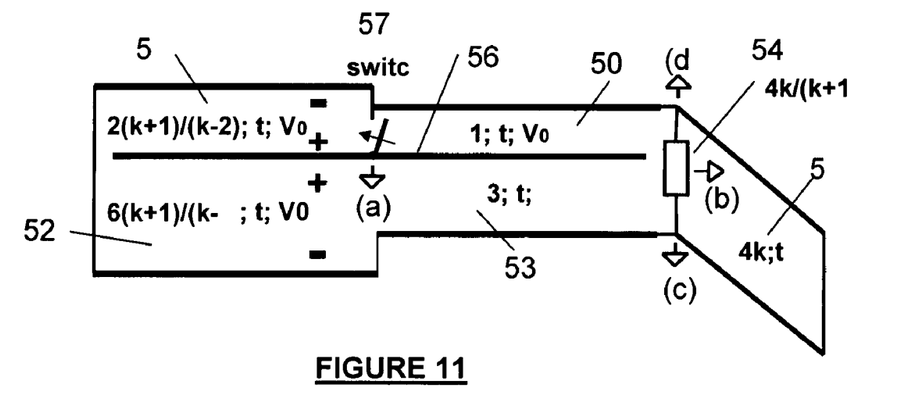
FIG. 11 depicts a schematic of bipolar pulse generator according to FIG. 10 with normalized optimum values of characteristic impedances and load impedance relative to Z1=1.

The main differences between the generators on FIG. 6 and FIG. 10 are in the factor of four in impedance transformation and in minimum values of parameter k, which equals 2 for generator on FIG. 10 and FIG. 11. For k=2, this generator is converted to the generators shown on FIG. 6a in co-pending patent application by Simon London, entitled "BiPolar Pulse Generator With Voltage Multiplication," filed on Nov. 9, 2005 and assigned application Ser. No. 11/269,847. For k=∞ this generator is converted to FIG. 3 (prior art).

The graph on FIG. 9b is also applicable for generator FIG. 10, FIG. 11 with four times greater load impedance.

In many practical cases, a ground connection is needed. FIG. 10 and FIG. 11 shows how ground connections may be implemented. In general, a ground may be implemented at any one point. Illustrative positions for grounds are shown on FIG. 10 and on FIG. 11 by (a), (b), (c) and (d). It should be noted that, as indicated by (a), a whole center conductor 56 that separates two pairs of transmission lines 50, 51 and 52, 53 may be grounded.

Figure 12A:
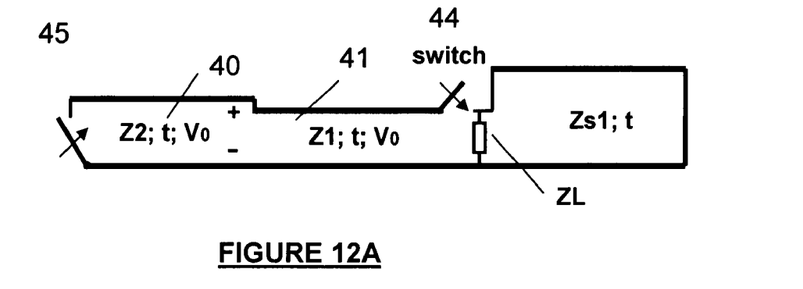

FIGS. 12a, b depicts bipolar pulse generators according to other embodiments of the present invention in an unfolded configuration of generators on FIG. 6 and FIG. 10, respectively. These implementations may be well suited for generating very short pulses. For FIG. 12b ground may be implemented at any one point indicated on FIG. 10. Each generator on FIGS. 12a, b consists of two simultaneously closed switches 44, 45 and 57, 58 respectively. Each switch carries a lower current and the sum of currents in each pair of switches is the same as in a single switch of respective generator according to FIG. 6 and FIG. 10.

Figure 13A:
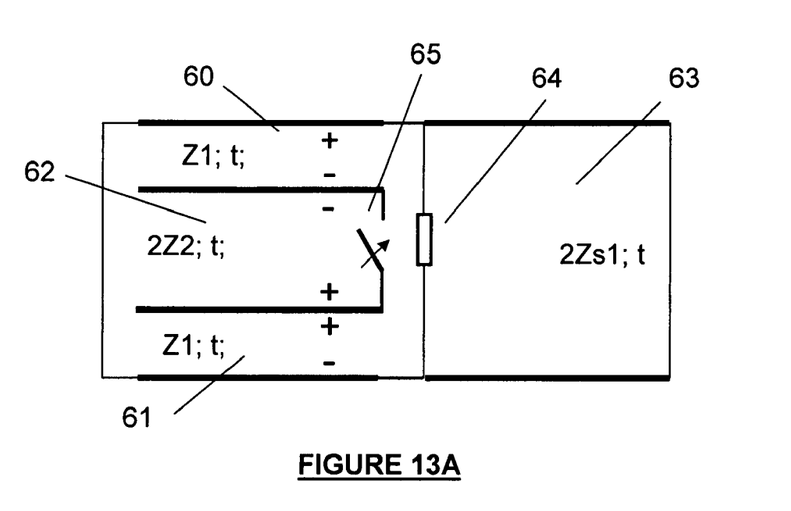

FIG. 13a illustrates a schematic of a bipolar pulse generator according to another embodiment of the present invention. In this case, the generator circuit based on FIG. 6 has a symmetrical (balanced) configuration and provides double the power and impedance transformation. Also, losses are about 20% lower due to the elimination of a middle conductor after joining two identical schematics FIG. 6 and flipping one of the circuits of FIG. 6 vertically. Because of full symmetry and identical operation of each part, characteristic impedances of transmission lines: 60 and 61 are equal. The impedances of transmission lines 62 and 63 as well as impedance of load 64 are twice as large as the characteristic impedances of transmission lines 40 and 42 respectively, and as the load impedance 43.

Figure 13B:
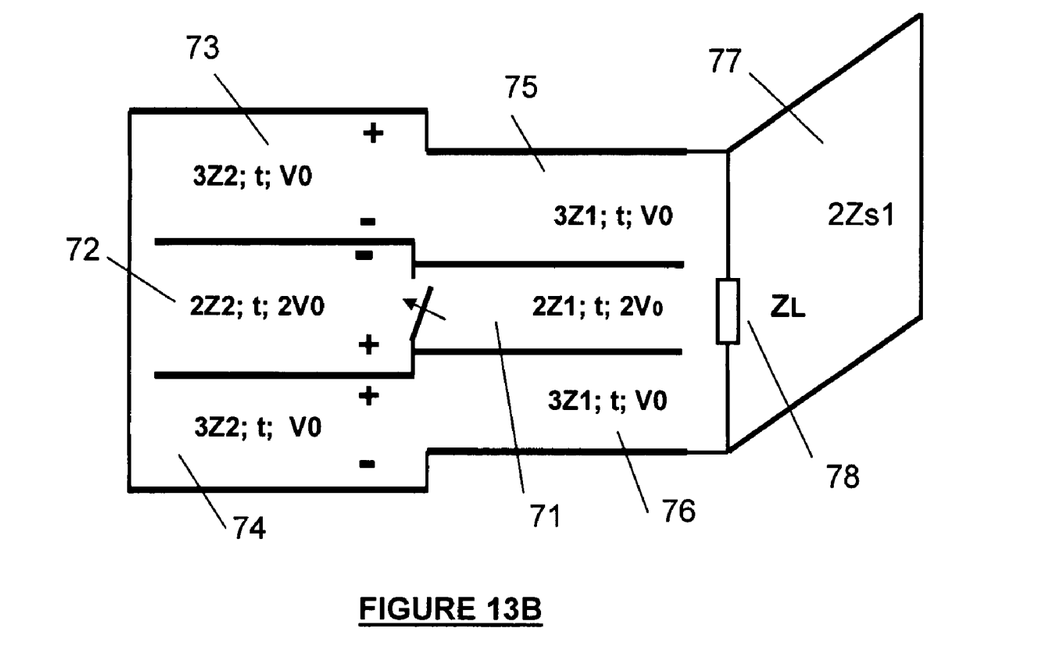

FIG. 13b illustrates a schematic of a bipolar pulse generator according to another embodiment of the present invention. In this case, the generator circuit based on FIG. 10 (FIG. 11) has a symmetrical (balanced) configuration and provides double the power/energy and impedance transformation. Also, losses are about 20% lower due to the elimination of a middle conductor after joining two identical schematics FIG. 10 (FIG. 11) and flipping one of the circuits of FIG. 10 (FIG. 11) vertically. Because of full symmetry characteristic impedances of transmission lines: 73 and 74, 75 and 76 are equal. The impedances of transmission lines 71 and 72 as well as impedance of load 78 are twice as large as the characteristic impedances of transmission lines 50 and 51 respectively and as the load impedance 55.

The process of waves propagation on transmission lines after closing switch 44 in generator according to FIG. 6 or to FIG. 9a is slightly different in magnitudes of reflected waves in interconnections of transmission lines depending on coefficient k, but for all allowable different values of characteristic impedances one unipolar sub-pulse is generated on the load during double transit time (2 t) of wave propagation in each transmission line after the initial pulse appears on the load. Second unipolar sub-pulse with the same magnitude and opposite polarity is generated on the load during the next period, which is also equal to double transit time (2 t) of wave propagation in each transmission line. In all variations of circuit's parameters (different values of parameter k) of bipolar pulse generators of the present invention, the resulting impedance of all lines connected to the load is equal to load impedance. It provides a matching between the pulse generator as a whole and the load.

Figure 12B:
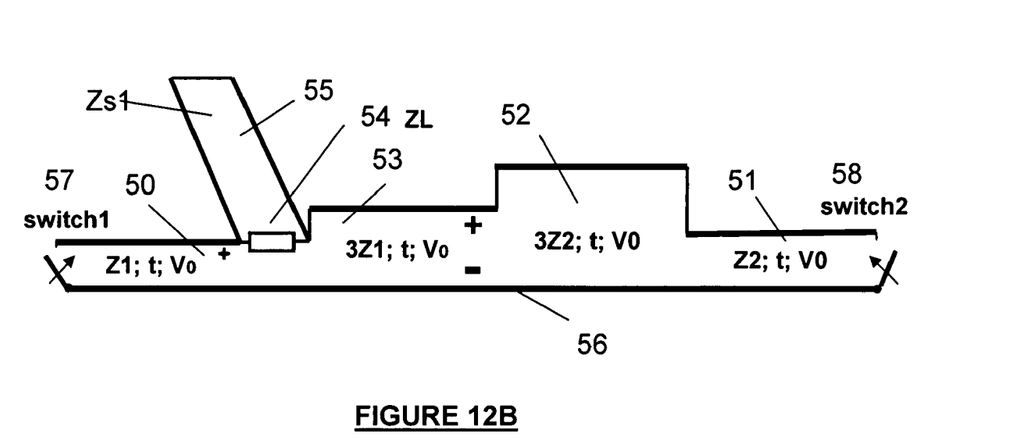

Similar process with more inter-structure reflections takes place for generators, according to FIG. 10 (FIG. 11), FIG. 12b and FIGS. 13a, b. The bipolar pulse on the load is delayed by transient time t of each line after switching.

Figure 14:
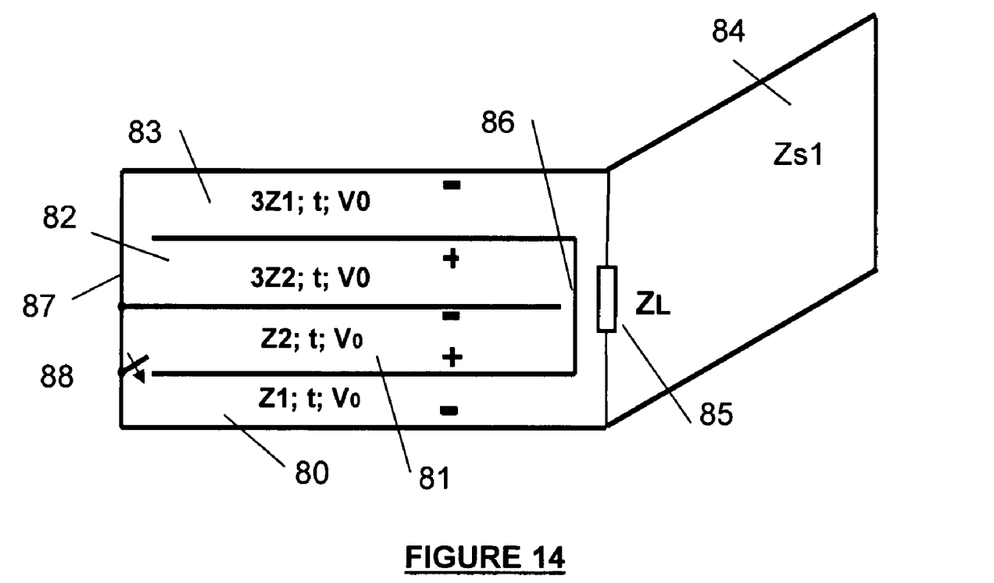
FIG. 14 depicts another schematic of a five-line bipolar pulse generator according to an embodiment of the present invention, which forms a configuration with each charged line at separate level.

FIG. 14 depicts another embodiment of the present invention, which may be suited for pulses of moderate length. Each of the four charged transmission line 80-83 occupies a separate level. This generator operates exactly as those shown on FIG. 10 (FIG. 11).

Figure 15:
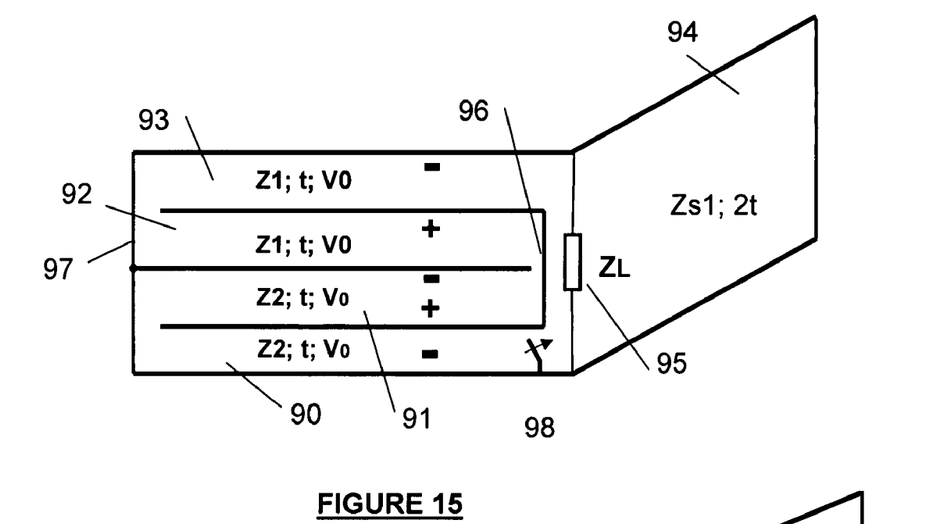
FIG. 15 depicts schematic of a bipolar pulse generator according to an embodiment of the present invention, which forms a double folded configuration of generator FIG. 6.

FIG. 15 depicts another embodiment of the present invention, which operates exactly as the generator on FIG. 6, in which each charged transmission lines with impedances Z2 and Z1 occupies two levels: 90, 91 and 92, 93, respectively. Inductive stub 94 may be the part of additional impedance transformer, as indicated on FIG. 7 and FIG. 8 or as a part of generator if necessary. Load impedance 95 is resistive and is equal to parallel connected impedances Z1 and Zs1. Interconnections 96 and 97 are very short, i.e., their lengths may be neglected.

Figure 16:
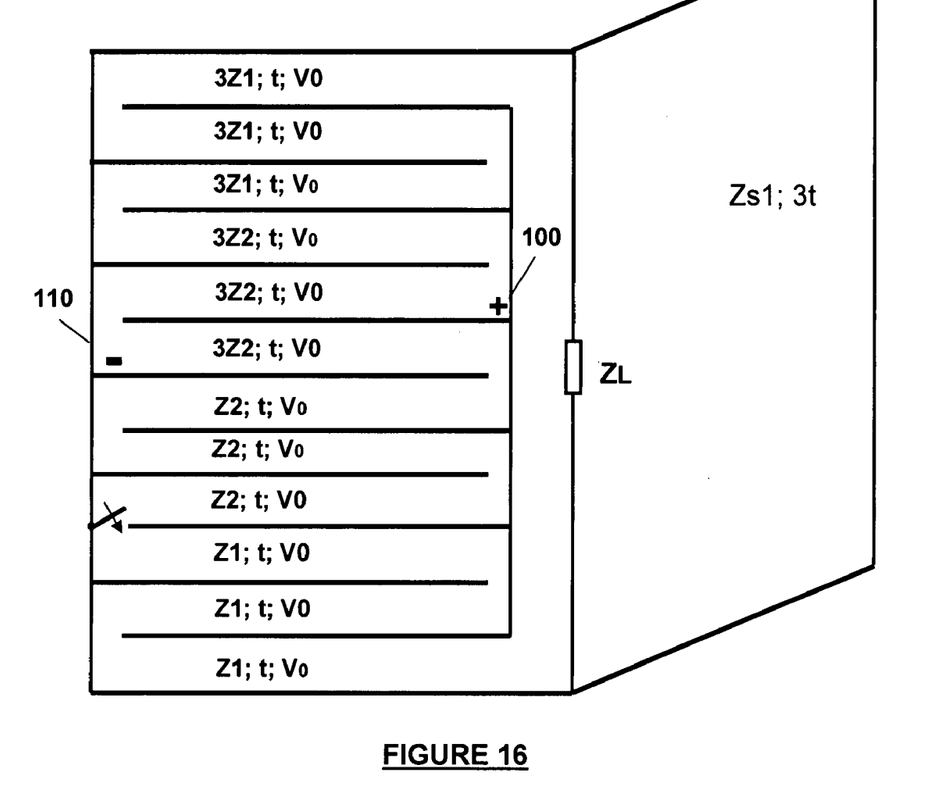
FIG. 16 depicts another schematic of a five-line bipolar pulse generator according to an embodiment of the present invention, which form a triple folded configuration.

A further decrease in length may be achieved with increasing the "level" of folding structure, as shown on FIG. 16, which illustrates a triple-folded design of the generator, according to FIG. 14. In this structure all seven transmission line conductors connected to the load ZL and to the stub (Zs1; 3 t) by a very short interconnection 110 (common point) have negative potential, while all six transmission line conductors connected to common point 100 have positive potential. This generator creates bipolar pulse with total length 6 t.

Figure 17:
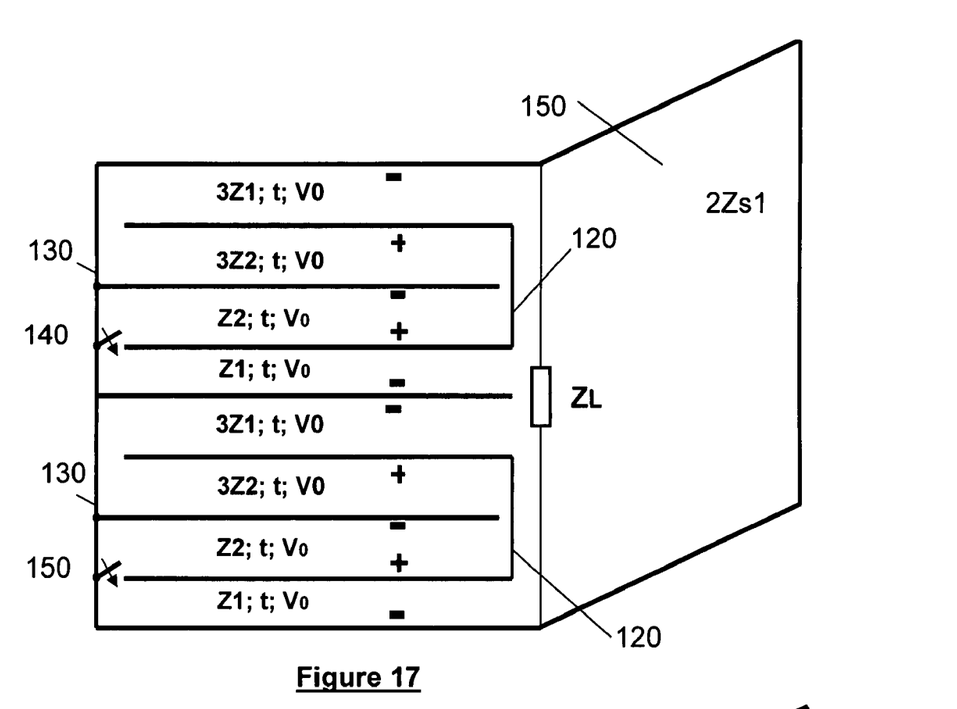
FIG. 17 depicts another schematic of a bipolar pulse generator according to an embodiment of the present invention, which comprises a stacked configuration of two balanced pulse generators shown in FIG. 14.

According to another embodiment of the present invention a structure, for example, shown on FIG. 14 may be effectively used as a building block for increasing the impedance transformation and power/energy of a bipolar pulse generator. As an example, FIG. 17 illustrates a stacked configuration of two generators according to FIG. 14 with very short interconnections 120 and 130. Both switches 140 and 150 should be closed at the same time. This structure, as well as previous structures, is suitable with respect to positions of switches for photoconductive switches activated by fiber-optic cables. The propagation of a wave through the structure of FIG. 17 is identical as for each sub-structure (FIG. 14).

The number of stacked sub-structures (FIG. 14) may be three, four, or any convenient number. The load impedance ZL and power on the load will be increased in proportion to the number of sub-structures used.

Figure 18:
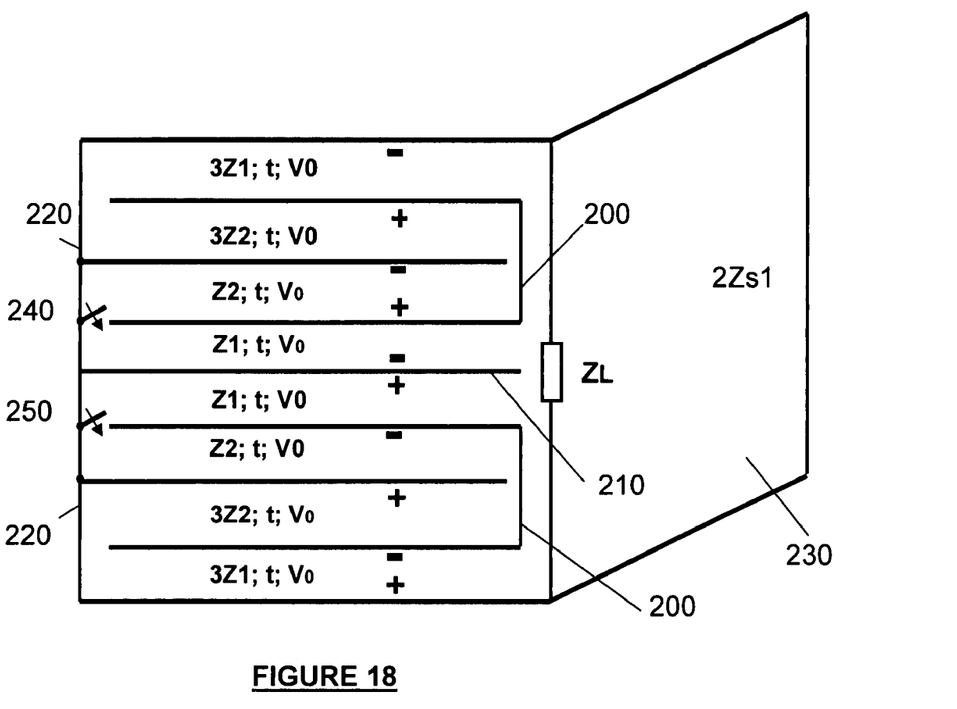
FIG. 18 depicts another schematic of bipolar pulse generator, according to an embodiment of the present invention, which comprises a balanced configuration of two five-line pulse generators shown in FIG. 14.

FIG. 18 illustrates balanced configuration, based on two generators according to FIG. 14 with short interconnections 200 and 220. In this case the center conductor 210 could be removed to decrease losses in the generator. However, the charging voltage on the central transmission line with characteristic impedance 2Z1 (instead of two lines with characteristic impedances Z1) should be 2V0 instead of V0 on each line. Two switches 240 and 250 should be closed simultaneously. Inductive stub 230 could be referred to followed impedance transformer as its inherent element.

Figure 19:
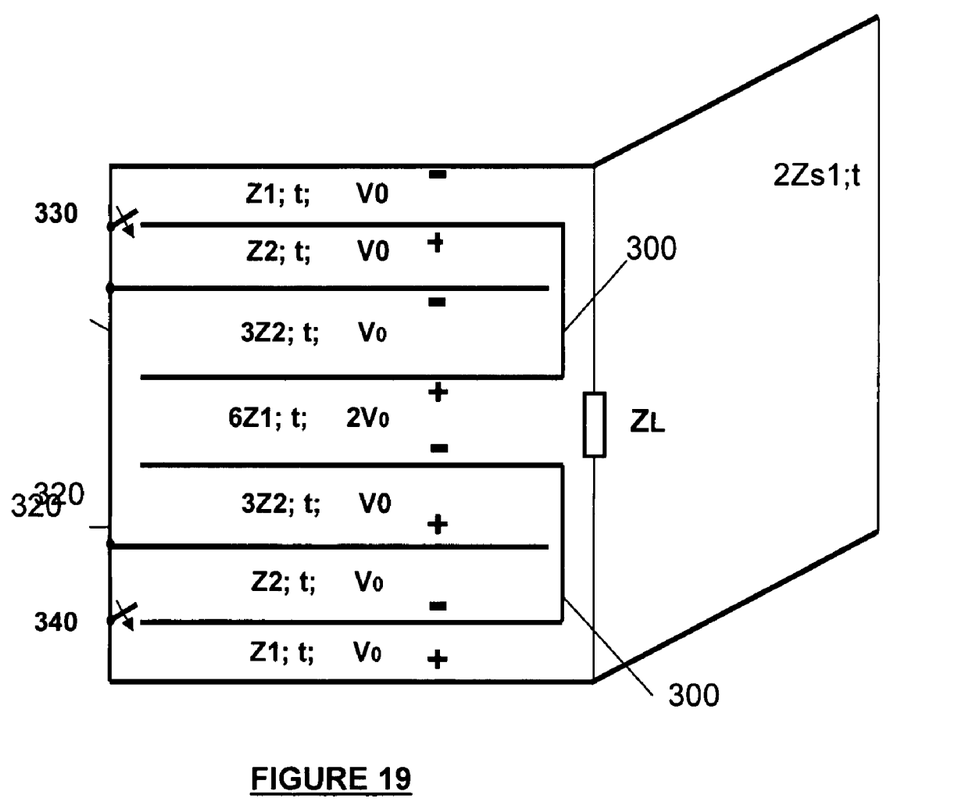
FIG. 19 depicts another schematic of bipolar pulse generator, according to an embodiment of the present invention, which comprises another balanced configuration of two pulse generators shown in FIG. 14.

FIG. 19 illustrates another balanced configuration based on two generators according to FIG. 14. In this case, double charging voltage should apply to the transmission line with characteristic impedance 6Z1.

It should be noted that for further increasing power and impedance transformation to the load, balanced structures according to FIG. 18 and FIG. 19 may be interconnected in a balanced manner to form "double-balanced" structures, etc. Also, the balanced structures FIG. 18 and FIG. 19 may be stacked to increase impedance transformation and power. In addition, stacked architecture discussed above with respect to the structure of FIG. 14 is applicable to structures FIG. 6, FIGS. 13a, b, FIG. 15, FIG. 16 and other implementations according to embodiments of the present invention.

For low-impedance transmission lines the height of each transmission line (thickness of dielectric) is in the range of several mils and up to few tenths of mils. It means the total thickness of stacked or balanced structures still remains small and usually significantly smaller compared to the width and length of each transmission line. Resulting stacked, balanced and folded structures are very compact.

While particular embodiments of the present invention have been shown and described, it will be understood by those having ordinary skill in the art that changes may be made to those embodiments without departing from the spirit and scope of the present invention. In particular, it will be understood that bipolar pulse generators according to the present invention may be implemented with different transformation ratios, different numbers of transmission lines and switches, and different ratios of transmission line characteristic impedances.

In addition, the bipolar pulse generators may be realized in any number of different physical implementations, including where transmission lines are parallel plate or coaxial conductors.

What is claimed is:

1. A bipolar pulse generator, comprising:
a closing switch; and
charged transmission line conductors; and
a load;
wherein the closing switch generates a bipolar pulse by discharging the transmission line conductors and wherein the generator provides an impedance transformation and maximizes energy transfer, including an inductive stub in parallel with the load.

2. The bipolar pulse generator according to claim 1, comprising three interconnected transmission line conductors, one being in the middle of two outer transmission line conductors, and one switch coupling the middle one of the transmission line conductors to one of the outer transmission line conductors and wherein the load and the stub are coupled between the outer transmission line conductors at a distal end and the outer transmission line conductors are coupled together at a proximal end.

3. The bipolar pulse generator according to claim 2, wherein the stub is part of a 1:2 transformer.

4. The bipolar pulse generator according to claim 2, wherein a first relative impedance of a first transmission line formed between the outer transmission line conductor coupled to the switch and the middle transmission line conductor is $(1+k)/(k-1)$, a second relative impedance of a second transmission line formed between the middle transmission line conductor and the other outer transmission line conductor is 1 and a third relative impedance of a third transmission line stub formed between the outer transmission line conductors is k, and the load has a relative impedance of $k/(k+1)$.

5. The bipolar pulse generator according to claim 2, wherein at least one of the transmission line conductors is implemented in a folded configuration.

6. The bipolar pulse generator according to claim 1, comprising five interconnected transmission line conductors, one in the middle of a first and a second set of outer transmission line conductors, and one switch coupling the middle one of the transmission line conductors to an outer one of the transmission line conductors of both of the sets at a point of interconnection between the sets, and wherein the load and the stub are coupled between the outer transmission line conductors at a distal end of the second set of transmission line conductors opposite the switch and wherein the first set of outer transmission line are coupled together at a proximal end.

7. The bipolar pulse generator according to claim 6, wherein relative impedances among the transmission lines include:

a first relative impedance of $2(k+1)/(k-2)$ for a first transmission line formed between the middle conductor and the outer transmission line of the first set coupled to the switch;

a second relative impedance of $6(k+1)/(k-2)$ for a second transmission line formed between the middle conductor and the other outer transmission line of the first set;

a third relative impedance of 1 for a third transmission line formed between the middle conductor and the outer conductor of the second set coupled to the switch; and a fourth relative impedance of 3 for a fourth transmission line formed between the middle conductor and the other outer transmission line of the second set.

8. The bipolar pulse generator of claim 7, wherein a ground potential is coupled to one of:

the middle transmission line conductor, to one side of the load, and to a middle point within the load.

9. The bipolar pulse generator according to claim 6, wherein at least one of the transmission line conductors is implemented in a folded configuration.

10. The bipolar pulse generator of claim 1, further comprising:

first, second and common interconnected transmission line conductors and two switches, wherein a first one of the switches couples the first transmission line conductor to the common transmission line conductor at a proximal end, a distal end of the first transmission line conductor is coupled to a proximal end of the second transmission line conductor, and the second one of the switches couples the distal end of the second transmission line conductor to a load and a stub coupled between the second transmission line conductor and a distal end of the common transmission line conductor.

11. The bipolar pulse generator of claim 1, further comprising:

first, second, third, fourth and common interconnected transmission line conductors and two switches, wherein a first one of the switches couples the first transmission line conductor to the common transmission line conductor at a proximal end, a distal end of the first transmission line conductor is coupled to a proximal end of the second transmission line conductor through the load and stub, the distal end of the second transmission line conductor is coupled to a proximal end of the third transmission line conductor, the distal end of the third transmission line conductor is coupled to a proximal end of the fourth transmission line conductor, and the second one of the switches couples a distal end of the fourth transmission line conductor to the common conductor.

12. The bipolar pulse generator according to claim 1, comprising at least four interconnected transmission line conductors, two of the transmission line conductors in the middle between the other two, outer transmission line conductors, and one switch coupling the middle transmission line conductors together at a distal end, wherein the outer transmission line conductors are coupled together at a proximal end and wherein the load and the stub are coupled between the outer transmission line conductors at a distal end.

13. The bipolar pulse generator according to claim 1, comprising:

at least eight interconnected transmission line conductors, wherein a first middle set of two of the transmission line conductors is disposed in between a first outer set of two outer transmission line conductors, and a second middle set of two of the transmission line conductors is disposed in between a second outer set of the transmission line conductors, and the first middle set is coupled to the second middle set at respective distal and proximal ends thereof;

a switch coupling the first middle set of transmission line conductors together at a distal end thereof; and wherein the first set of outer transmission line conductors are coupled together at a proximal end, the first and second set of outer transmission line conductors are coupled together at respective distal and proximal ends thereof, and the load and the stub are coupled between the second set of outer transmission line conductors at a distal end.

14. The bipolar pulse generator according to claim 13, wherein the following impedances are present between the transmission line conductors:

$3Z1$ between the second outer set of transmission line conductors and the second middle set of transmission line conductors;

$2Z1$ between the second middle set of transmission line conductors;

$3Z2$ between the first outer set of transmission line conductors and the first middle set of transmission line conductors; and $2Z2$ between the first middle set of transmission line conductors; and wherein impedances of the load and stub are determined based on $Z1$ and $Z2$.

15. The bipolar pulse generator according to claim 1, comprising:

at least five interconnected transmission line conductors, wherein first and second outer transmission line conductors are coupled together at proximal ends thereof and to the load and the stub at distal ends thereof, and wherein a middle one of the conductors is coupled to the proximal ends of the outer conductors at a proximal end thereof, and first and second inner transmission line conductors that are coupled together at distal ends thereof and are respectively disposed between the middle transmission line conductor and one of the first and second outer transmission line conductors; and a switch coupled between a proximal end of a first one of the inner transmission line conductors and to the proximal end of the outer transmission line conductors.

16. The bipolar pulse generator according to claim 15, wherein the following impedances are present between the transmission line conductors:

$Z1$ between the first outer transmission line conductor and the first inner transmission line conductor;

$Z2$ between the first inner transmission line conductor and the middle transmission line conductor;

$3Z2$ between the middle transmission line conductor and the second inner transmission line conductor;

$3Z1$ between the second inner transmission line conductor and the second outer transmission line conductor; and wherein impedances of the load and stub are determined based on $Z1$ and $Z2$.

17. The bipolar pulse generator according to claim 1, comprising:

at least five interconnected transmission line conductors, wherein first and second outer transmission line conductors are coupled together at proximal ends thereof and to the load and the stub at distal ends thereof, and wherein a middle one of the conductors is coupled to the proximal ends of the outer conductors at a proximal end thereof, and first and second inner transmission line conductors that are coupled together at respective distal ends thereof and are respectively disposed between the middle transmission line conductor and one of the first and outer transmission line conductors; and a switch coupled between a distal end of the first inner transmission line conductors and to the distal end of the first outer transmission line conductor.

18. The bipolar pulse generator according to claim 17, wherein the following impedances are present between the transmission line conductors:

Z2 between the first outer transmission line conductor and the first inner transmission line conductor;

Z2 between the first inner transmission line conductor and the middle transmission line conductor;

Z1 between the middle transmission line conductor and the second inner transmission line conductor;

Z1 between the second inner transmission line conductor and the second outer transmission line conductor; and wherein impedances of the load and stub are determined based on Z1 and Z2.

19. The bipolar pulse generator according to claim 1, comprising:

n transmission line conductors disposed in a stack, including first and second outer transmission line conductors coupled together at proximal ends thereof and coupled to the load and stub at distal ends thereof; and a switch;

wherein odd numbered transmission line conductors counting from one of the outside transmission line conductors are coupled to the outer transmission conductors at proximal ends thereof and even numbered transmission line conductors are coupled together at distal ends thereof, and the switch is coupled between the proximal ends of the outer transmission line conductors and one of the even transmission line conductors; and wherein n is equal to 1+4(2k−1), and k is selected to be an integer.

20. The bipolar pulse generator according to claim 19, wherein the following impedances are present between the transmission line conductors:

Z1 between the first k transmission line conductors;

Z2 between the second k transmission line conductors;

3Z2 between the third k transmission line conductors; and

3Z1 between the fourth k transmission line conductors; and wherein impedances of the load and stub are determined based on Z1 and Z2.

21. The bipolar pulse generator according to claim 1, comprising:

nine transmission line conductors disposed in a stack, including first and second outer transmission line conductors coupled together at proximal ends thereof and coupled to the load and stub at distal ends thereof; and at least two switches;

wherein odd numbered transmission line conductors counting from the first outer transmission line conductor are coupled at proximal ends thereof to the outer transmission conductors at proximal ends thereof and the first and second even numbered transmission line conductors are coupled together at distal ends thereof, and the third and fourth even numbered transmission line conductors are coupled together at distal ends thereof;

and wherein a first one of the at least two switches couples the third even transmission lines to the proximal ends of the outer transmission line conductors and a second one of the at least two switches couples the fourth even transmission line conductor to the proximal ends of the outer transmission line conductors.

22. The bipolar pulse generator according to claim 21, wherein the first switch couples a proximal end of the first even transmission line conductor to the proximal ends of the outer transmission line conductors and the second switch couples a proximal end of the third even transmission line conductor to the proximal end of the outer transmission line conductors.

23. The bipolar pulse generator according to claim 22, wherein the following impedances are present between the transmission line conductors:

Z1 between the first and second transmission line conductors;

Z2 between the second and third transmission line conductors;

3Z2 between the third and fourth transmission line conductors;

3Z1 between the fourth and fifth transmission line conductors;

Z1 between the fifth and sixth transmission line conductors;

Z2 between the sixth and seventh transmission line conductors;

3Z2 between the seventh and eighth transmission line conductors; and

3Z1 between the eighth and ninth transmission line conductors; and wherein impedances of the load and stub are determined based on Z1 and Z2.

24. The bipolar pulse generator according to claim 21, wherein the first switch couples a proximal end of the second even transmission line conductor to the proximal ends of the outer transmission line conductors and the second switch couples a proximal end of the third even transmission line conductor to the proximal end of the outer transmission line conductors.

25. The bipolar pulse generator according to claim 24, wherein the following impedances are present between the transmission line conductors:

3Z1 between the first and second transmission line conductors;

3Z2 between the second and third transmission line conductors;

Z2 between the third and fourth transmission line conductors;

Z1 between the fourth and fifth transmission line conductors;

Z1 between the fifth and sixth transmission line conductors;

Z2 between the sixth and seventh transmission line conductors;

3Z2 between the seventh and eighth transmission line conductors; and

3Z1 between the eighth and ninth transmission line conductors; and wherein impedances of the load and stub are determined based on Z1 and Z2.

26. The bipolar pulse generator according to claim 1, eight transmission line conductors disposed in a stack, including first and second outer transmission line conductors coupled together at proximal ends thereof and coupled to the load and stub at distal ends thereof; and at least two switches;

wherein, counting from the first outer transmission line conductor, the first, third, and sixth transmission line conductors are coupled at proximal ends thereof to the outer transmission conductors at proximal ends thereof and the second and fourth numbered transmission line conductors are coupled together at distal ends thereof, and the fifth and seventh numbered transmission line conductors are coupled together at distal ends thereof and wherein a first one of the at least two switches couples a proximal end of the seventh transmission line conductor to the proximal ends of the outer transmission line conductors and a second one of the at least two switches couples a proximal end of the second transmission line conductor to the proximal ends of the outer transmission line conductors.

27. The bipolar pulse generator according to claim 26, wherein the following impedances are present between the transmission line conductors:

$Z1$ between the first and second transmission line conductors;

$Z2$ between the second and third transmission line conductors;

$3Z2$ between the third and fourth transmission line conductors;

$6Z1$ between the fourth and fifth transmission line conductors;

$3Z2$ between the fifth and sixth transmission line conductors;

$Z2$ between the sixth and seventh transmission line conductors; and $Z1$ between the seventh and eighth transmission line conductors; and wherein impedances of the load and stub are determined based on $Z1$ and $Z2$.

* * * * *